US012703791B2

(12) United States Patent
Mileva et al.

(10) Patent No.: US 12,703,791 B2
(45) **Date of Patent: *Aug. 11, 2026**

(54) PROPYLENE COMPOSITION FOR FOAMING WITH IMPROVED MECHANICAL PROPERTIES

(71) Applicant: BOREALIS AG, Vienna (AT)

(72) Inventors: Daniela Mileva, Linz (AT); Jingbo Wang, Linz (AT); Klaus Bernreitner, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 1007 days.

This patent is subject to a terminal disclaimer.

(21) Appl. No.: 17/778,573

(22) PCT Filed: Nov. 9, 2020

(86) PCT No.: PCT/EP2020/081415

§ 371 (c)(1),
(2) Date: May 20, 2022

(87) PCT Pub. No.: WO2021/104836

PCT Pub. Date: Jun. 3, 2021

(65) Prior Publication Data

US 2022/0411618 A1 Dec. 29, 2022

(30) Foreign Application Priority Data

Nov. 25, 2019 (EP) .................................... 19211273

(51) Int. Cl.

| | |
|---|---|
| ***B29C 45/00*** | (2006.01) |
| ***B29C 45/14*** | (2006.01) |
| ***B29K 23/00*** | (2006.01) |
| ***C08L 23/12*** | (2006.01) |
| ***C08L 23/14*** | (2006.01) |
| ***C08L 23/16*** | (2006.01) |

(52) U.S. Cl.

CPC ........ *C08L 23/142* (2013.01); *B29C 45/0001* (2013.01); *B29C 45/14795* (2013.01); *C08L 23/16* (2013.01); *B29K 2023/14* (2013.01); *B29K 2023/16* (2013.01); *C08L 2203/14* (2013.01); *C08L 2205/025* (2013.01); *C08L 2205/03* (2013.01); *C08L 2207/02* (2013.01); *C08L 2314/06* (2013.01)

(58) Field of Classification Search

CPC .... B29K 2023/14; C08L 23/12; C08L 23/142

See application file for complete search history.

(56) References Cited

U.S. PATENT DOCUMENTS 10,875,993 B2 * 12/2020 Gahleitner ............ C08F 210/06
11,643,537 B2 * 5/2023 Wang ...................... C08L 23/12
524/451
12,084,567 B2 * 9/2024 Wang ...................... C08L 23/12
12,240,969 B2 * 3/2025 Wang .................... C08F 210/16
2009/0270545 A1 10/2009 Sahnoune
2011/0245427 A1 * 10/2011 Cavalieri ................ C08L 23/14
525/240
2013/0095267 A1 * 4/2013 Cavalieri ................ B32B 27/32
525/240
2013/0108818 A1 * 5/2013 Cavalieri ............. C08F 210/06
138/140
2021/0179831 A1 * 6/2021 Wang ...................... C08L 23/16
2021/0253838 A1 * 8/2021 Wang ...................... C08L 23/12
2022/0332931 A1 * 10/2022 Wang ......................... C08J 5/18
2022/0389204 A1 * 12/2022 Wang .................. B29C 45/0001

FOREIGN PATENT DOCUMENTS

| | | | |
|---|---|---|---|
| CN | 102015877 | A | 4/2011 |
| EA | 014019 | B1 | 8/2010 |
| EP | 0887379 | B1 | 12/1998 |
| EP | 3456776 | A1 | 3/2019 |
| JP | 2002-283382 | A | 10/2002 |
| JP | 2006-249350 | A | 9/2006 |
| JP | 2011-126984 | A | 6/2011 |
| RU | 2471813 | C2 | 1/2013 |
| RU | 2478668 | C2 | 4/2013 |
| RU | 2668075 | C2 | 9/2018 |
| WO | 92/12182 | A1 | 7/1992 |

(Continued)

OTHER PUBLICATIONS

Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Cheng, et al., "13C NMR Analysis of Ethylene-Propylene Rubbers", Macromolecules 17, 1984, 1950-1955.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene-Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.

(Continued)

*Primary Examiner* — Melissa A Rioja

(74) *Attorney, Agent, or Firm* — Tarolli, Sundheim, Covell & Tummino LLP

(57) ABSTRACT

A polypropylene composition (C) comprising: i) from 55.0 to 95.0 wt.-% of a heterophasic propylene copolymer (HECO), ii) from 5.0 to 45.0 wt.-% of a copolymer (CP), preferably a random copolymer, of propylene and at least one comonomer selected from the group of C4-C10 alpha-olefins that has been synthesized in the presence of a single-site catalyst, wherein the polypropylene composition (C) has a melt flow rate MFR2 of from 1.0 to 30.0 g/10 min, and wherein the polypropylene composition (C) has a Charpy Notched Impact Strength NIS of greater than or equal to 16.0 kJ/m2.

14 Claims, No Drawings

(56) References Cited

FOREIGN PATENT DOCUMENTS

| | | | |
|---|---|---|---|
| WO | 1997028170 | A1 | 8/1997 |
| WO | 1998046616 | A1 | 10/1998 |
| WO | 1998049208 | A1 | 11/1998 |
| WO | 199856831 | A1 | 12/1998 |
| WO | 199858976 | A1 | 12/1998 |
| WO | 1999012981 | A1 | 3/1999 |
| WO | 1999019335 | A1 | 4/1999 |
| WO | 200034341 | A2 | 6/2000 |
| WO | 2012025584 | A1 | 3/2012 |
| WO | 2013007650 | A1 | 1/2013 |
| WO | 2015011135 | A1 | 1/2015 |
| WO | 2020034341 | A1 | 2/2020 |
| WO | 2020245369 | A1 | 12/2020 |

OTHER PUBLICATIONS

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Filip, Xenia, et al, "Heteronuclear Decoupling Under Fast Mas by a Rotor-Synchronized Hahn-Echo Pulse Train", Journal of Magnetic Rosonance 176 (2005) 239-243.

Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.

Klimke, Katja, et al., "Optimisation and Application of Polyolefin Branch Quantification by Melt-State 13CNMR Spectroscopy", Macromol. Chem. Phys. 2006, 207, p. 382-395.

Parkinson, Matthew, et al., "Effect of Branch Length on 13C NMR Relation Properties in Molten Poly[ethylene-co-(alpha-olefin)] Model Systems", Macromol. Chem, Phys. 2007, 208-2128-2133.

Pollard, M. Pollard, et al., "Observation of Chain Branching in Polyethylene in the Solid State and Melt via 13C NMR Spectroscopy and Melt NMR Relation Time Measurements", Macromolecules 2004, 37, 813-825.

Castignolles, Patrice, et al., "Detection and quantification of branching in polyacrylates by size-exclusion chromotography (SEC) and melt-state 13C NMR Spectroscopy", Polymer 50 (2009) 2373-2383.

Kakugo, M., Naito, Y., Mizunuma, K., Miyatake, T. Macromolecules 15 (1982) 1150.

D. Rosato, D. Rodato, M. Rosato, Injection moulding handbook, 3rd Edition, vol. 1, ISBN 978-1-4613-7077-2, 2000.

Applicant: Borealis AG; "Propylene Composition for Foaming with Improved Mechanical Properties"; European Application No. 19211273; Extended European Search Report dated May 25, 2020; 6 pgs.

Korean Application No. 10-2022-7021035, Office Action dated Apr. 5, 2024.

Applicant: Borealis AG, AT; Russian Application No. 2022116723/04 Filed Nov. 9, 2020; Russian Office Action; Jan. 31, 2023; 24 pgs.

Basov N.I. et al., Quality Control of polymeric Materials. Edited by V.A. Braginsky, 2nd edition, corrected, Leningrad, "Chemistry"], 1990, 112 pages (D1).

Chinese Application No. 202080080446.3 Office Action dated Apr. 12, 2023.

Korean Notice of Allowance dated Dec. 11, 2024.

Japanese Application No. 2022-529460, Office Action dated Jul. 25, 2023.

Applicant: Borealis AG; European Application No. 19211273.8; European Office Action dated Nov. 15, 2022; 4 pgs.

* cited by examiner

PROPYLENE COMPOSITION FOR FOAMING WITH IMPROVED MECHANICAL PROPERTIES

FIELD OF THE INVENTION

The present invention is directed to a polypropylene composition (C) comprising a heterophasic propylene copolymer (HECO) and a copolymer (CP) of propylene and at least one comonomer selected from the group of $C_4$-$C_{10}$ alpha-olefins that has been synthesized in the presence of a single-site catalyst. The invention is further directed to an injection molded article comprising said polypropylene composition (C) and a foamed article comprising said propylene composition (C).

BACKGROUND

Polypropylene is used in many applications and is for instance the material of choice in many fields such as automotive applications because they can be tailored to specific purposes needed. However, the recent demand in plastic industry is towards weight reduction. Foaming of polymer compounds via injection-molding (FIM) technology is gaining wide interest both scientifically and industrially due to its capability to produce low-density parts with high geometrical accuracy and improved dimensional stability. With this technique, a product with a cellular core and solid skin can be molded in a single operation. Basically, FIM includes the use of an inert gas that is to be dispersed in the polymer melt or by pre-blending a resin with a chemical blowing (or foaming) agent which under heat releases inert gas. The gas bubbles then expand within the melt, filling the mould and creating the internal cellular structure. In injection molding of thermoplastics containing a blowing agent the mixture is held under sufficient back pressure to retain the gas and prevent premature expansion. Depending on the weight requirements, a specific amount of material is dosed and the melt is injected into the mold. The entrapped gas expands as soon as the melt/gas mixture enters the empty mould unless a sufficiently high enough counter pressure is applied. Achieving uniform and high-cell-density microstructure, which is critical for obtaining superior mechanical properties and excellent emissions in foamed plastics is challenging in FIM and can be controlled by process conditions. The influence of process conditions such as blowing agent content, mould temperature, melt temperature, injection pressure, and back pressure may be varied in order to produce high quality foam in terms of low skin thickness, small cell sizes, and narrow cell size distribution is well known. However, the influence of polymer design on the foamed structure and emissions has been rarely investigated so far.

As a result, polypropylene compositions with excellent foamability are still desired. Furthermore, it is desired that these polypropylene compositions result in foamed parts having a fine cellular structure and at the same time keep good balance of mechanical properties.

The finding of the present invention is that a polypropylene composition having excellent foamability in combination with a good balance of mechanical properties of the foamed parts can be obtained with a combination of a specific heterophasic propylene copolymer and specific copolymer of propylene.

SUMMARY

The present invention is directed to a polypropylene composition (C) comprising:

i) from 55.0 to 95.0 wt.-%, based on the total weight of the composition, of a heterophasic propylene copolymer (HECO), ii) from 5.0 to 45.0 wt.-%, based on the total weight of the composition, of a copolymer (CP), preferably a random copolymer, of propylene and at least one comonomer selected from the group of $C_4$-$C_{10}$ alpha-olefins that has been synthesized in the presence of a single-site catalyst, wherein the polypropylene composition (C) has a melt flow rate $MFR_2$ measured according to ISO 1333 at 230° C. and 2.16 kg of from 1.0 to 30.0 g/10 min, and wherein the polypropylene composition (C) has a Charpy Notched Impact Strength NIS measured according to ISO 179-1eA at 23° C. of greater than or equal to 16.0 $kJ/m^2$.

The present invention is further directed to an injection molded article comprising the polypropylene composition (C).

The present invention is also directed to a foamed article, preferably foamed injection molded article, comprising the polypropylene composition (C).

The invention is finally also directed to the use of a copolymer (CP), preferably a random copolymer, of propylene and at least one comonomer selected from the group of $C_4$-$C_{10}$ alpha-olefins that has been synthesized in the presence of a single-site catalyst in a composition comprising a heterophasic propylene copolymer for increasing the Charpy Notched Impact Strength and/or elongation at break of the composition without significantly reducing either the tensile or flexural modulus.

In the following, the invention is defined in more detail.

DETAILED DESCRIPTION

Definitions

A propylene homopolymer is a polymer that essentially consists of propylene monomer units. Due to impurities especially during commercial polymerization processes, a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms. In the following amounts are given in % by weight (wt.-%) unless it is stated otherwise.

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. In case of a random heterophasic propylene copolymer, said crystalline matrix phase is a random copolymer of propylene and at least one alpha-olefin comonomer.

The elastomeric phase can be a propylene copolymer with a high amount of comonomer that is not randomly distributed in the polymer chain but is distributed in a comonomer-rich block structure and a propylene-rich block structure. A heterophasic polypropylene usually differentiates from a monophasic propylene copolymer in that it shows two distinct glass transition temperatures Tg which are attributed to the matrix phase and the elastomeric phase.

The Polypropylene Composition (C)

The polypropylene composition (C) of the present invention comprises several essential components, including the heterophasic propylene copolymer (HECO) and the copolymer (CP), preferably random copolymer, of propylene. Accordingly, the propylene composition (C) comprises:

i) from 55.0 to 95.0 wt.-%, based on the total weight of the composition, of a heterophasic polypropylene copolymer (HECO), ii) from 5.0 to 45.0 wt.-%, based on the total weight of the composition, of a copolymer (CP), preferably a random copolymer, of propylene and at least one comonomer selected from the group of $C_4$-$C_{10}$ alpha-olefins that has been synthesized in the presence of a single-site catalyst, wherein the polypropylene composition (C) has a melt flow rate $MFR_2$ measured according to ISO 1333 at 230° C. and 2.16 kg of from 1.0 to 30.0 g/10 min, and wherein the polypropylene composition (C) has a Charpy Notched Impact Strength NIS measured according to ISO 179-1eA at 23° C. of greater than or equal to 16.0 kJ/m$^2$.

In a preferred embodiment, the polypropylene composition (C) of the present invention comprises i) from 55.0 to 95.0 wt.-%, based on the total weight of the composition, of a heterophasic polypropylene copolymer (HECO), ii) from 5.0 to 45.0 wt.-%, based on the total weight of the composition, of a copolymer (CP), preferably a random copolymer, of propylene and at least one comonomer selected from the group of $C_4$-$C_{10}$ alpha-olefins that has been synthesized in the presence of a single-site catalyst, iii) from 0 to 15 wt.-%, based on the total weight of the composition, of a mineral filler, wherein the polypropylene composition (C) has a melt flow rate $MFR_2$ measured according to ISO 1333 at 230° C. and 2.16 kg of from 1.0 to 30.0 g/10 min, and wherein the polypropylene composition (C) has a Charpy Notched Impact Strength NIS measured according to ISO 179-1eA at 23° C. of greater than or equal to 16.0 kJ/m$^2$.

The polypropylene composition (C) of the present invention can comprise further components, in addition to the essential components as defined above. However, it is preferred that the individual contents of the heterophasic propylene copolymer (HECO), the copolymer (CP), preferably random copolymer, of propylene, and the optional filler (F) add up to at least 90 wt.-%, more preferably to at least 95 wt.-%, based on the total weight of the polypropylene composition (C).

Typical further polymeric components could be, for example, additives, the selection of which would be well-known to the skilled practitioner, and masterbatch polypropylenes, used to introduce the additives to the polypropylene composition (C).

Typically additives would be selected from antioxidants, anti-slip agents, nucleating agents, anti-scratch agents, anti-scorch agents, metal deactivators, UV-stabilisers, acid scavengers, lubricants, anti-static agents, pigments and the like, as well as combinations thereof. These additives are well known in the polymer industry and their use will be familiar to the skilled practitioner. Any additives which are present may be added as an isolated raw material or in a mixture with a carrier polymer, i.e. in a so-called master batch.

In one embodiment the polypropylene composition (C) of the present invention comprises:

i) from 55.0 to 95.0 wt.-% of the heterophasic propylene copolymer (HECO), ii) from 5.0 to 45.0 wt.-% of the copolymer (CP), preferably random copolymer, of propylene, and iii) optionally from 0 to 15 wt.-% of the mineral filler (F).

The content of heterophasic propylene copolymer (HECO) within the polypropylene composition (C) is from 55.0 to 95.0 wt.-%, more preferably from 58 to 92 wt.-%, most preferably from 60 to 90 wt.-%.

The content of copolymer (CP), preferably random copolymer, of propylene within the polypropylene composition (C) is from 5.0 to 45.0 wt.-%, more preferably from 8.0 to 42.0 wt.-%, most preferably from 10.0 to 40.0 wt.-%.

It is therefore preferred that the polypropylene composition (C) comprises:

i) from 58.0 to 92.0 wt.-% of the heterophasic propylene copolymer (HECO), ii) from 8.0 to 42.0 wt.-% of the copolymer (CP), preferably random copolymer, of propylene, and iii) optionally from 0 to 15 wt.-% of the mineral filler (F).

It is further preferred that the polypropylene composition (C) comprises:

i) from 60.0 to 90.0 wt.-% of the heterophasic propylene copolymer (HECO), ii) from 10.0 to 40.0 wt.-% of the copolymer (CP), preferably random copolymer, of propylene, and iii) optionally from 0 to 15 wt.-% of the mineral filler (F).

Preparing and further processing the polypropylene composition (C) includes mixing the individual components of the polypropylene composition (C), for instance by use of a conventional compounding or blending apparatus, e.g. a Banbury mixer, a 2-roll rubber mill, Buss-co-kneader or a twin screw extruder. A typical extruding temperature is in the range of 170 to 270° C., or more preferably in the range of 180 to 240° C.

The polypropylene composition (C) of the present invention has a melt flow rate $MFR_2$ measured according to ISO 1333 at 230° C. and 2.16 kg of from 1.0 to 30.0 g/10 min, preferably from 2.0 to 20.0, more preferably from 3.0 to 15.0, most preferably in the range from 4.0 to 13.0 g/10 min.

The polypropylene composition (C) of the present invention has a Charpy Notched Impact Strength NIS measured according to ISO 179-1eA at 23° C. of greater than or equal to 16.0 kJ/m$^2$, preferably of greater than or equal to 21.0 kJ/m$^2$, more preferably of greater than or equal to 25.0 kJ/m$^2$, most preferably of greater than or equal to 27.0 kJ/m$^2$.

The polypropylene composition (C) of the present invention preferably has a tensile modulus measured according to ISO 527-1, −2 in the range from 900 to 2500 MPa, more preferably in the range from 950 to 2200 MPa, most preferably in the range from 1000 to 2000 MPa The polypropylene composition (C) of the present invention preferably has a flexural modulus measured according to ISO 178 in the range of 850 to 2500 MPa, more preferably in the range from 900 to 2200 MPa, most preferably in the range from 950 to 2000 MPa The polypropylene composition (C) of the present invention preferably has a melting temperature ($T_m$) measured by differential scanning calorimetry (DSC) in the range from 155 to 172° C., more preferably in the range from 158 to 170° C., most preferably in the range from 160 to 167° C.

The polypropylene composition (C) of the present invention preferably has a crystallization temperature ($T_a$) measured by differential scanning calorimetry (DSC) in the range from 116 to 136° C., more preferably in the range from 120 to 133° C., most preferably in the range from 124 to 130° C.

The polypropylene composition (C) of the present invention preferably has a puncture energy measured according to ISO 6603-2 at 23° C. in the range from 10.0 to 50.0 J, more preferably from 15.0 to 46.0 J, most preferably in the range from 20.0 to 42.0 J The polypropylene composition (C) of the present invention preferably has a puncture energy measured according to ISO 6603-2 at −30° C. in the range from 25.0 to 60.0 J, more preferably from 30.0 to 55.0 J, most preferably in the range from 35.0 to 50.0 J.

The polypropylene composition (C) of the present invention preferably has an elongation at break measured according to ISO 527 in the range from 30 to 750%, more preferably from 35 to 600%, most preferably in the range from 40 to 500%.

The polypropylene composition (C) of the present invention preferably has a shrinkage in flow measured according to EN DIN ISO 294-4 of less than 2.0%, more preferably of less than 1.8%, most preferably of less than 1.6%.

The polypropylene composition (C) of the present invention preferably has a shrinkage cross flow measured according to EN DIN ISO 294-4 of less than 2.2%, more preferably of less than 2.0%, most preferably of less than 1.8%.

The Heterophasic Propylene Copolymer (HECO)

The heterophasic propylene copolymer (HECO) of the present invention preferably has a content of ethylene as determined from $^{13}C$-NMR spectroscopy in the range from 5.0 to 20.0 wt.-%, more preferably from 7.0 to 17.0 wt.-%, most preferably in the range from 9.0 to 15.0 wt.-%

The heterophasic propylene copolymer (HECO) of the present invention preferably has a melt flow rate $MFR_2$ measured according to ISO 1333 at 230° C. and 2.16 kg in the range from 5.0 to 50.0 g/10 min, more preferably from 10.0 to 40.0 g/10 min, most preferably in the range from 12.0 to 30.0 g/10 min The heterophasic propylene copolymer (HECO) of the present invention preferably has a xylene cold soluble fraction (XCS) determined at 23° C. according to ISO 16152 in the range from 18.0 to 40.0 wt.-%, more preferably in the range from 20.0 to 37.0 wt.-%, most preferably in the range from 23.0 to 35.0 wt.-%, like in the range from 25.0 to 33.0 wt.-%.

The heterophasic propylene copolymer (HECO) of the present invention preferably has an intrinsic viscosity (iV) of the xylene cold soluble fraction measured according to DIN ISO 1628/1, October 1999 (in Decalin at 135° C.) in the range from 2.0 to 4.0 dl/g, more preferably in the range from 2.5 to 3.5 dl/g, most preferably in the range from 2.7 to 3.3 dl/g, like in the range from 2.9 to 3.2 dl/g.

The heterophasic propylene copolymer (HECO) of the present invention preferably has a Charpy Notched Impact Strength NIS measured according to ISO 179-1 eA at 23° C. in the range of 10.0 to 30.0 $kJ/m^2$, more preferably from 12.0 to 25.0 $kJ/m^2$, most preferably in the range from 13.0 to 20.0 $kJ/m^2$.

The heterophasic propylene copolymer (HECO) of the present invention preferably has a flexural modulus measured according to ISO 178 in the range of 800 to 1500 MPa, more preferably from 850 to 1300 MPa, most preferably in the range from 900 to 1100 MPa.

According to a preferred embodiment, the heterophasic propylene copolymer (HECO) of the present invention has been polymerized using a heterogeneous Ziegler-Natta type catalyst system and/or has been polymerized in a multi-stage polymerization plant.

The Copolymer (CP)

The copolymer (CP), preferably random copolymer, of the present invention is a copolymer of propylene and at least one comnomer selected from the group of $C_4$-$C_{10}$ alpha olefins that has been synthesized in the presence of a single-site catalyst, preferably either a copolymer of propylene and 1-butene or a copolymer of propylene and 1-hexene that has been synthesized in the presence of a single-site catalyst.

The copolymer (CP), preferably random copolymer, of the present invention preferably has a melt flow rate $MFR_2$ measured according to ISO 1333 at 230° C. and 2.16 kg in the range from 0.1 to 10.0 g/10 min, more preferably from 0.2 to 7.0 g/10 min, yet more preferably from 0.3 to 4.0 g/10 min, most preferably from 0.5 to 2.0 g/10 min.

The copolymer (CP), preferably random copolymer, of the present invention preferably has a xylene cold soluble fraction (XCS) determined at 23° C. according to ISO 16152 in the range from 0.1 to 7.5 wt.-%, more preferably from 0.2 to 5.0 wt.-%, yet more preferably from 0.3 to 3.0 wt.-%, most preferably in the range from 0.4 to 2.0 wt.-%.

The copolymer (CP), preferably random copolymer, of the present invention preferably has a melting temperature ($T_m$) measured by differential scanning calorimetry (DSC) in the range from 120 to 155° C., more preferably from 130 to 150° C., most preferably in the range from 135 to 145° C.

The copolymer (CP), preferably random copolymer, of the present invention preferably has a comonomer content of from 0.1 to 5.0 mol.-%, more preferably from 0.5 to 4.5 mol.-%, yet more preferably from 1.0 to 4.0 mol.-%, most preferably in the range from 1.5 to 3.5 mol.-%.

According to one preferred embodiment, the copolymer (CP) of the present invention is a random copolymer of propylene and 1-hexene, comprising i) 30 to 70 wt.-% of a first random propylene copolymer (CP-A) of propylene and a 1-hexene having a 1-hexene content in the range of 0.05 to below 1.9 mol.-%, and ii) 70 to 30 wt.-% of a second random propylene copolymer (CP-B) of propylene and 1-hexene having a higher 1-hexene content than the first random propylene copolymer (CP-A), wherein the copolymer (CP) has an overall 1-hexene content in the range of 0.5 to 4.5 mol.-%, and wherein the copolymer (CP) has a xylene soluble content (XCS) in the range of 0.2 to 5.0 wt.-%.

According to another preferred embodiment, the copolymer (CP) of the present invention is a random copolymer of propylene and 1-butene, comprising i) 30 to 70 wt % of a propylene butene copolymer (CP-A) having a 1-butene content of 0.4 to 7.7 mol.-%; and (ii) 70 to 30 wt % of a propylene butene copolymer (CP-B) having a 1-butene content of 0.8 to 6.1 mol.-%;

wherein the copolymer (CP) has an MFR of 1.0 to 20.0 g/10 min and a 1-butene content of 1.1 to 6.1 mol.-%, and wherein copolymers (CP-A) and (CP-B) are different.

Preparation of the Copolymer (CP) of Propylene

The copolymer (CP) is preferably a random copolymer of propylene, in particular obtainable, preferably obtained, by a process as defined in detail below.

The process for the preparation of a random copolymer (CP) of propylene present in the polypropylene composition (C) as defined above is a sequential polymerization process comprising at least two reactors connected in series, wherein said process comprises the steps of (A) polymerizing in a first reactor (R-1) being a slurry reactor (SR), preferably a loop reactor (LR), propylene and at least one comnomer selected from the group of $C_4$-$C_{10}$ alpha olefins, obtaining a first random propylene copolymer (A), (B) transferring said first random propylene copolymer (A) and unreacted comonomers of the first reactor (R-1) in a second reactor (R-2) being a gas phase reactor (GPR-1), (C) feeding to said second reactor (R-2) propylene and at least one comnomer selected from the group of $C_4$-$C_{10}$ alpha olefins, (D) polymerizing in said second reactor (R-2) and in the presence of said first random propylene copolymer (A) propylene and at least one comnomer selected from the group of $C_4$-$C_{10}$ alpha olefins, obtaining a second random propylene copolymer (B), said first random propylene copolymer (A) and said second random propylene copolymer (B) forming the random copolymer (CP) as defined in the instant invention, wherein further in the first reactor (R-1) and second reactor (R-2) the polymerization takes place in the presence of a solid catalyst system (SCS), said solid catalyst system (SCS) comprises (i) a transition metal compound of formula (I)

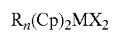

(I)

wherein

"M" is zirconium (Zr) or hafnium (Hf), each "X" is independently a monovalent anionic σ-ligand, each "Cp" is a cyclopentadienyl-type organic ligand independently selected from the group consisting of unsubstituted or substituted and/or fused cyclopentadienyl, substituted or unsubstituted indenyl or substituted or unsubstituted fluorenyl, said organic ligands coordinate to the transition metal (M), "R" is a bivalent bridging group linking said organic ligands (Cp), "n" is 1 or 2, preferably 1, and (ii) optionally a cocatalyst (Co) comprising an element (E) of group 13 of the periodic table (IUPAC), preferably a cocatalyst (Co) comprising a compound of A1 and/or B.

Concerning the definition of the random copolymer (CP), the first random propylene copolymer (A) and the second random propylene copolymer (B) it is referred to the definitions given above.

The solid catalyst system (SCS) is defined in more detail below.

The term "sequential polymerization process" indicates that the random copolymer (CP) is produced in at least two reactors connected in series. More precisely the term "sequential polymerization process" indicates in the present application that the polymer of the first reactor (R-1) is directly conveyed with unreacted comonomers to the second reactor (R-2). Accordingly the decisive aspect of the present process is the preparation of the random copolymer (CP) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place there. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be any continuous or simple stirred batch tank reactor or loop reactor operating in slurry. According to the present invention the slurry reactor (SR) is preferably a loop reactor (LR).

The second reactor (R-2) and any subsequent reactor are gas phase reactors (GPR). Such gas phase reactors (GPR) can be any mechanically mixed or fluid bed reactors. Preferably the gas phase reactor(s) (GPR) comprise a mechanically agitated fluid bed reactor with gas velocities of at least 0.2 m/sec. Thus it is appreciated that the gas phase reactor (GPR) is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is a slurry reactor (SR), like a loop reactor (LR), whereas the second reactor (R-2) is a gas phase reactor (GPR-1). The subsequent reactors—if present—are also gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing the random copolymer (CP) as defined above the conditions for the first reactor (R-1), i.e. the slurry reactor (SR), like a loop reactor (LR), of step (A) may be as follows:

the temperature is within the range of 40° C. to 110° C., preferably between 60° C. and 100° C., more preferably in the range of 65 to 90° C., the pressure is within the range of 20 bar to 80 bar, preferably between 40 bar to 70 bar, hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:

the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for producing the random copolymer (CP) the residence time in the slurry reactor (SR), e.g. loop (LR) is in the range 0.2 to 4.0 hours, e.g. 0.3 to 1.5 hours and the residence time in the gas phase reactor (GPR) will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

The random copolymer (CP) according to the present invention is prepared in the presence of a solid catalyst system (SCS) comprising a transition metal compound.

In a preferred embodiment the transition metal compound has the formula (I)

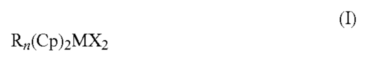

$$R_n(Cp)_2MX_2 \quad (I)$$

wherein each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —$SiR''_3$, —$OSiR''_3$, —SR", —$PR''_2$, OR" or —$NR''_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —$NR''_2$, the two substituents R" can form a ring, e.g. five- or six-membered ring, together with the nitrogen atom to which they are attached;

R is a bridge of 1-3 atoms, e.g. a bridge of 1-2 C-atoms and 0-2 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —$SiR^{10}_2$, wherein each $R^{10}$ is independently C1-C20-alkyl, C3-12 cycloalkyl, C6-C20-aryl or tri(C1-C20-alkyl) silyl-residue, such as trimethylsilyl;

M is a transition metal of Group 4, e.g. Zr or Hf, especially Zr;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —$PR''_3$, —$SiR''_3$, —$OSiR''_3$, —$NR''_2$ or —$CH_2$—Y, wherein Y is C6-C20-aryl, C6-C20-heteroaryl, C1-C20-alkoxy, C6-C20-aryloxy, $NR''_2$, —SR", —$PR''_3$, —$SiR''_3$, or —$OSiR''_3$;

each of the above mentioned ring moieties alone or as a part of another moiety as the substituent for Cp, X, R" or R can further be substituted e.g. with C1-C20-alkyl which may contain Si and/or O atoms;

n is 1 or 2.

Suitably, in each X as —$CH_2$—Y, each Y is independently selected from C6-C20-aryl, $NR''_2$, —$SiR''_3$ or —$OSiR''_3$. Most preferably, X as —$CH_2$—Y is benzyl. Each X other than —$CH_2$—Y is independently halogen, C1-C20-alkyl, C1-C20-alkoxy, C6-C20-aryl, C7-C20-arylalkenyl or —$NR''_2$ as defined above, e.g. —N(C1-C20-alkyl)$_2$.

Preferably, each X is halogen, methyl, phenyl or —$CH_2$—Y, and each Y is independently as defined above.

Cp is preferably cyclopentadienyl, indenyl or fluorenyl, optionally substituted as defined above. Ideally Cp is cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-aryialkyl (wherein the aryl ring alone or as a part of a further moiety may further be substituted as indicated above), —$OSiR''_3$, wherein R" is as indicated above, preferably C1-C20-alkyl.

R, is preferably a methylene, ethylene or a silyl bridge, whereby the silyl can be substituted as defined above, e.g. a (dimethyl)Si=, (methylphenyl)Si=, (methylccylcohexyl) silyl= or (trimethylsilylmethyl)Si=; n is 0 or 1. Preferably, R" is other than hydrogen.

A specific subgroup includes the well known metallocenes of Zr and Hf with two eta5-ligands which are bridged with cyclopentadienyl ligands optionally-substituted with e.g. siloxy, or alkyl (e.g. C1-6-alkyl) as defined above, or with two bridged indenyl ligands optionally substituted in any of the ring moieties with e.g. siloxy or alkyl as defined above, e.g. at 2-, 3-, 4- and/or 7-positions. Preferred bridges are ethylene or —$SiMe_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —$NR''_2$ ligand see i.a. in WO-A-985683 1 and WO-A-0034341. For the preparation see also e.g. in EP-A-260 130. WO-A-9728170, WO-A-9846616, WO-A-9849208, WO-A-9912981, WO-A-9919335, WO-A-9856831, WO-A-00 34341, EP-A-423 101 and EP-A-537 130.

The complexes of the invention are preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane.

Preferred complexes of the invention are of formula (II') or (II)

(II)

(II')

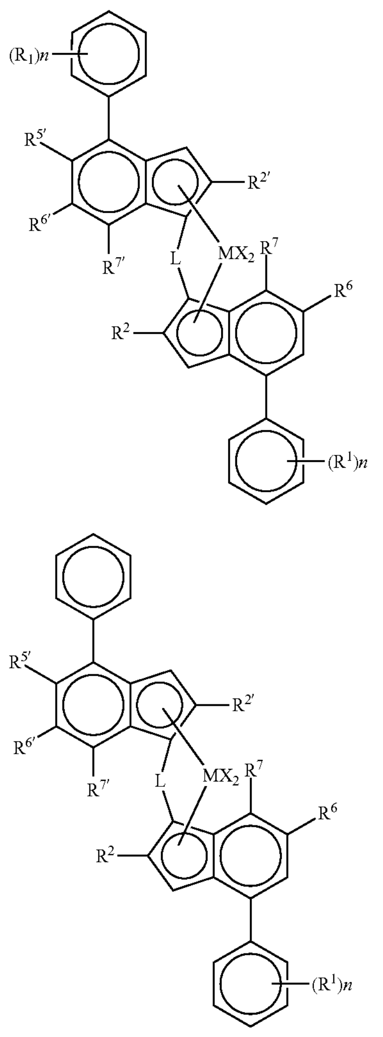

wherein

M is Zr;

each X is a sigma ligand, preferably each X is independently a hydrogen atom, a halogen atom, a C1-C6 alkoxy group, C1-C6 alkyl, phenyl or a benzyl group;

L is a divalent bridge selected from —$R'_2C$—, —$R'_2C$—$CR'_2$, —$R'_2Si$—, —$R'_2Si$—$SiR'_2$—, —$R'_2Ge$—, wherein each R' is independently a hydrogen atom, C1-C20 alkyl, C3-C10 cycloalkyl, tri(C1-C20-alkyl) silyl, C6-C20-aryl, C7-C20 arylalkyl each $R^2$ or $R^{2\prime}$ is a C1-C10 alkyl group;

$R^{5\prime}$ is a C1-C10 alkyl group or a $Z'R^{3\prime}$ group;

$R^6$ is hydrogen or a C1-C10 alkyl group;

$R^{6\prime}$ is a C1-C10 alkyl group or a C6-C10 aryl group;

$R^7$ is hydrogen, a C1-C6 alkyl group or a $ZR^3$ group;

$R^{7\prime}$ is hydrogen or a C1-C10 alkyl group;

Z and Z' are independently O or S;

$R^{3\prime}$ is a C1-C10 alkyl group, or a C6-C10 aryl group optionally substituted by one or more halogen groups;

$R^3$ is a C1-C10 alkyl group;

each n is independently 0 to 4, e.g. 0, 1 or 2;

and each $R^1$ is independently a C1-C20 hydrocarbyl group, e.g. a C1-C10 alkyl group.

Particularly preferred compounds of the invention include:

rac-dimethylsilanediylbis[2-methyl-4-(4-tert-butylphenyl)-1,5,6,7-tetrahydro-s-indacen-1-yl]zirconium dichloride rac-dimethylsilanediylbis(2-methyl-4-phenyl-5-methoxy-6-tert-butylinden-1-yl) zirconium dichloride rac-anti-$Me_2Si$(2-Me-4-Ph-6-tBu-Ind)(2-Me-4-Ph-5-OMe-6-tBu-Ind)$ZrCl_2$ rac-anti-$Me_2Si$(2-Me-4-(p-tBuPh)-Ind)(2-Me-4-Ph-5-OMe-6-tBu-Ind)$ZrCl_2$ rac-anti-$Me_2Si$(2-Me-4-(3,5-di-tBuPh)-6-tBu-Ind)(2-Me-4-Ph-5-OMe-6-tBu-Ind)$ZrCl_2$ rac-anti-$Me_2Si$(2-Me-4-(p-tBuPh)-Ind)(2-Me-4-Ph-5-$0C_6F_5$)-6-iPr-Ind)$ZrCl_2$ rac-anti-Me(CyHex)Si(2-Me-4-Ph-6-tBu-Ind)(2-Me-4-Ph-5-OMe-6-tBu-Ind)$ZrCl_2$ rac-anti-$Me_2Si$(2-Me-4-(3,5-di-tBuPh)-7-Me-Ind)(2-Me-4-Ph-5-OMe-6-tBu-Ind)$ZrCl_2$ rac-anti-$Me_2Si$(2-Me-4-(3,5-di-tBuPh)-7-OMe-Ind)(2-Me-4-Ph-5-OMe-6-tBu-Ind)$ZrCl_2$ rac-anti-$Me_2Si$(2-Me-4-(p-tBuPh)-6-tBu-Ind)(2-Me-4-Ph-5-OMe-6-tBu-Ind)$ZrCl_2$ rac-anti-$Me_2Si$(2-Me-4-(p-tBuPh)-Ind)(2-Me-4-(4-tBuPh)-5-OMe-6-tBu-Ind)$ZrCl_2$ rac-anti-$Me_2Si$(2-Me-4-(p-tBuPh)-Ind)(2-Me-4-(3,5-tBu2Ph)-5-OMe-6-tBu-Ind)$ZrCl_2$ rac-anti-$Me_2Si$(2-Me-4-(p-tBuPh)-Ind)(2-Me-4-Ph-5-OtBu-6-tBu-Ind)$ZrCl_2$.

The most preferred metallocene complex (procatalyst) is rac-anti-dimethylsilandiyl(2-methyl-4-phenyl-5-methoxy-6-tert-butyl-indenyl)(2-methyl-4-(4-tert-butylphenyl)indenyl)zirconium dichloride.

Besides the metallocene complex (procatalyst), the metallocene catalyst comprises additionally a cocatalyst as defined in WO 2015/011135 A1. Accordingly the preferred cocatalyst is methylaluminoxane (MAO) and/or a borate, preferably trityl tetrakis(pentafluorophenyl)borate.

It is especially preferred that the metallocene catalyst is unsupported, i.e. no external carrier is used. Regarding the preparation of such a metallocene complex again reference is made to WO 2015/011135 A1.

Mineral Filler (F)

In addition, the polypropylene composition according to the present invention may comprise a mineral filler (F) in amounts from 0 to 15.0 wt.-%, based on the total weight of the polypropylene composition.

Preferably, the polypropylene composition comprises the mineral filler (F) in amounts from 2 to 13 wt.-%, like in the range of 3 to 12 wt.-%, based on the total weight of the polypropylene composition.

In one specific embodiment, the polypropylene composition is free of a mineral filler (F).

If present, the mineral filler (F) is preferably selected from mica, wollastonite, kaolinite, smectite, montmorillonite, talc and mixtures thereof.

In general, the mineral filler (F) may have a median particle size $d_{50}$ in the range from 0.1 to 30 μm, preferably in the range from 0.2 to 25 μm, more preferably in the range from 0.3 to 20 μm.

A preferred filler (F) is talc. Preferably talc having a median particle size $d_{50}$ in the range from 0.1 to 10 μm, preferably in the range from 0.2 to 6.0 μm, more preferably in the range from 0.3 to 4.0 μm is used as filler (F). Most preferably, talc is used as the sole mineral filler (F). Still more preferably, the talc used has a top-cut particle size (95% of particles below that size, according to ISO 787-7)

of 0.8 to 50 μm, preferably from 1.0 to 25 μm and most preferably from 1.2 to 20 μm.

Articles and Uses

The present polypropylene composition (C) can be used in the production of articles such as molded articles, preferably injection molded articles. Furthermore, the present polypropylene composition can be used for the production of foamed articles such as foamed injection molded articles. Even more preferred is the use for the production of automotive articles, especially of automotive interior articles and exterior articles, like instrumental carriers, front end module, shrouds, structural carriers, bumpers, side trims, step assists, body panels, spoilers, dashboards, interior trims and the like. Preferably, the article is an automotive interior article.

The present invention thus refers in another aspect to an injection molded article comprising the polypropylene composition as defined herein It is preferred that the article has i) a flexural modulus measured according to ISO 178 in the range of 1000 to 1500 MPa, and/or ii) a puncture energy measured according to ISO 6603-2 at 23° C. greater than or equal to 17.0 J.

More preferably the article has i) a flexural modulus measured according to ISO 178 in the range of 1000 to 1500 MPa, and ii) a puncture energy measured according to ISO 6603-2 at 23° C. greater than or equal to 17.0 J.

In a further aspect the present invetion refers to a foamed article, preferably foamed injection molded article comprising the polypropylene composition as defined herein.

It is preferred that the foamed article has i) a flexural modulus measured according to ISO 178 in the range of 600 to 1200 MPa, and/or ii) a puncture energy measured according to ISO 6603-2 at 23° C. greater than or equal to 7.0 J.

More preferably the foamed article has i) a flexural modulus measured according to ISO 178 in the range of 600 to 1200 MPa, and ii) a puncture energy measured according to ISO 6603-2 at 23° C. greater than or equal to 7.0 J.

It is especially preferred that the foamed article as described herein has a flexural modulus measured according to ISO 178 that is in the range of 200 to 650 MPa lower than the flexural modulus of an unfoamed injection-molded article measured according to ISO 178.

The present invention is further directed to the use of a copolymer (CP), preferably a random copolymer, of propylene and at least one comonomer selected from the group of $C_4$-$C_{10}$ alpha-olefins that has been synthesized in the presence of a single-site catalyst in a composition comprising a heterophasic propylene copolymer for increasing the Charpy Notched Impact Strength and/or elongation at break of the composition without degrading either the tensile or flexural modulus.

All preferred embodiments as described for the polypropylene composition (C), heterophaisc propylene copolymer (HECO) and copolymer (CP), preferably a random copolymer, of propylene may also be applied to the present articles and uses as described.

The present invention will now be illustrated by the examples provided below. The experimental data and examples shown below are understood by the skilled practitioner to be illustrative and do not further delimit the invention.

EXAMPLES

1. Determination Methods $MFR_2$ (230° C.) was measured according to ISO 1133 (230° C., 2.16 kg load).

The xylene cold solubles (XCS, wt.-%) were determined at 25° C. according to ISO 16152; first edition; 2005-07-01.

Quantification of microstructure by NMR spectroscopy—Ethylene content in HECO Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Content of 1-Hexene for a Propylene 1-Hexene Copolymer (CP)

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207:382., Pollard, M., Klimke, K., Graf, R., Spiess, H. W., Wilhelm, M., Sperber, O., Piel, C., Kaminsky, W., Macromolecules 2004; 37:813), and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I\alpha B4/2$$

The amount of 1-hexene incorporated in PHHP double consecutive sequences was quantified using the integral of the ααB4 site at 41.7 ppm accounting for the number of reporting sites per comonomer:

$$HH=2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H=(I\alpha B4-2*I\alpha\alpha B4)/2$$

The total 1-hexene content was calculated based on the sum of isolated and consecutively incorporated 1-hexene:

$$Htotal=H+HH$$

When no sites indicative of consecutive incorporation observed the total 1-hexeen comonomer content was calculated solely on this quantity:

$$Htotal=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the aa21e9 methylene site at 42.4 ppm:

$$P21=I\alpha\alpha21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_S\alpha\alpha + 2*P21 + H + HH/2$$

The total amount of propene was quantified as the sum of primary (1,2) and secondary (2,1-erythro) inserted propene:

$$Ptotal = P12 + P21 = I_S\alpha\alpha + 3*I\alpha\alpha21e9 + (I\alpha B4 - 2*I\alpha\alpha B4)/2 + I\alpha\alpha B4$$

This simplifies to:

$$Ptotal = I_S\alpha\alpha + 3*I\alpha\alpha21e9 + 0.5*I\alpha B4$$

The total mole fraction of 1-hexene in the polymer was then calculated as:

$$fH = Htotal/(Htotal + Ptotal)$$

The full integral equation for the mole fraction of 1-hexene in the polymer was:

$$fH = (((I\alpha B4 - 2*I\alpha\alpha B4)/2) + (2*I\alpha\alpha B4))/((I_S\alpha\alpha + 3*I\alpha\alpha21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_S\alpha\alpha + 3*I\alpha\alpha21e9 + I\alpha B4 + I\alpha\alpha B4)$$

The total comonomer incorporation of 1-hexene in mole percent was calculated from the mole fraction in the usual manner:

$$H\ [\text{mol }\%] = 100*fH$$

The total comonomer incorporation of 1-hexene in weight percent was calculated from the mole fraction in the standard manner:

$$H\ [wt\ \%] = 100*(fH*84.16)/((fH*84.16) + ((1 - fH)*42.08))$$

Comonomer Content of 1-Butene for a Propylene 1-Butene Copolymer (CP)

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe head at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09} Standard single-pulse excitation was employed utilising the NOE at short recycle delays {klimke06, pollard04} and the RS-HEPT decoupling scheme. {fillip05, griffin07} A total of 1024 (1 k) transients were acquired per spectra using a 3 s recycle delay.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm {randall89}.

Basic Comonomer Content Method Spectral Analysis Method:

Characteristic signals corresponding to the incorporation of 1-butene were observed {randall89} and the comonomer content quantified in the following way. The amount of 1-butene incorporated in PPBPP isolated sequences was quantified using the integral of the αB2 sites at 43.6 ppm accounting for the number of reporting sites per comonomer:

$$B = I_\alpha/2$$

The amount of 1-butene incorporated in PPBBPP double consecutively sequences was quantified using the integral of the ααB2B2 site at 40.5 ppm accounting for the number of reporting sites per comonomer:

$$BB = 2*I_{\alpha\alpha}$$

When double consecutive incorporation was observed the amount of 1-butene incorporated in PPBPP isolated sequences needed to be compensated due to the overlap of the signals αB2 and αB2B2 at 43.9 ppm:

$$B = (I_\alpha - 2*I_{\alpha\alpha})/2$$

The total 1-butene content was calculated based on the sum of isolated and consecutively incorporated 1-butene:

$$Btotal = B + BB$$

The amount of propene was quantified based on the main Sαα methylene sites at 46.7 ppm and compensating for the relative amount of αB2 and αB2B2 methylene unit of propene not accounted for (note B and BB count number of butene monomers per sequence not the number of sequences):

$$Ptotal = I_{S\alpha\alpha} + B + BB/2$$

The total mole fraction of 1-butene in the polymer was then calculated as:

$$fB = Btotal/(Btotal + Ptotal)$$

The full integral equation for the mole fraction of 1-butene in the polymer was:

$$fB = \left(\left((I_{\alpha} - 2 * I_{\alpha\alpha})/2\right) + (2 * I_{\alpha\alpha})\right) / \left(I_{S\alpha\alpha} + \left((I_{\alpha} - 2 * I_{\alpha\alpha})/2\right) + \left((2 * I_{\alpha\alpha})/2\right)\right) + \left((I_{\alpha} - 2 * I_{\alpha\alpha})/2\right) + (2 * I_{\alpha\alpha})\right)$$

This simplifies to:

$$fB = (I_{\alpha}/2 + I_{\alpha\alpha})/(I_{S\alpha\alpha} + I_{\alpha} + I_{\alpha\alpha})$$

The total incorporation of 1-butene in mole percent was calculated from the mole fraction in the usual manner:

$$B\ [\text{mol}\ \%] = 100 * fB$$

The total incorporation of 1-butene in weight percent was calculated from the mole fraction in the standard manner:

$$B\ [wt\ \%] = 100 * (fB * 56.11)/((fB * 56.11) + ((1 - fB) * 42.08))$$

Tensile Modulus and elongation at break were determined according to ISO 527-2 (cross head speed=1 mm/min; test speed 50 mm/min at 23° C.) using dog-bone shape specimens machined from the injection molded or foam injection molded plaques as specified below.

Flexural Modulus was determined in 3-point-bending according to ISO 178 on injection molded specimens of 80×10×2 resp. 3 $mm^3$ machined from the injection molded or foam injection molded plaques as specified below.

Charpy Notched Impact Strength was determined according to ISO 179-1 eA at 23° C. on injection molded specimens of 80×10×2 resp. 3 $mm^3$ machined from the injection molded or foam injection molded plaques as specified below.

Puncture energy and Energy to max Force were determined on plaques with dimensions 148×148×2 resp. 3 $mm^3$ machined from the injection molded or foam injection molded plaques as specified below using an instrumented falling weight impact testing according to ISO 6603-2. The test was performed at room temperature with a lubricated tip with a diameter of 20 mm and impact velocity of 10 mm/s.

Particle size $d_{50}$ and top cut $d_{95}$ were calculated from the particle size distribution [mass percent] as determined by gravitational liquid sedimentation according to ISO 13317-3 (Sedigraph).

DSC analysis, melting temperature (Tm) and crystallization temperature (Tc): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C. Crystallization temperature and heat of crystallization (Hc) are determined from the cooling step, while melting temperature and heat of fusion (Hf) are determined from the second heating step.

Shrinkage:

The shrinkage in flow and cross flow direction was determined according to EN DIN ISO 294-4 on injection molded plaques of 60×60×2 $mm^3$. The plates had been molded on an Engel emotion 310/55 with a melt temperature of 230° C. and all other paramerers following ISO 294-1. Shrinkage in flow and cross flow direction relative to the original mold dimension was determined after 96 hours at 23° C.

2. Examples

Preparation of the Catalyst

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Preparation of the Polypropylene Composition (P)

The Polypropylene compositions (P) were prepared in a Borstar PP pilot unit with sequential process comprising a loop reactor and a gas phase reactor. The reaction conditions are summarized in Table 1. Table 2 describes the recipes for compounding the comparative and inventive examples, whilst Tables 3 and 4 contain the properties of the comparative and inventive examples.

TABLE 1

Preparation of the polypropylene composition (C)

| | CP1 | CP2 |
|---|---|---|
| **R-0 Prepolymerisation reactor** | | |
| Temp. (° C.) | 20 | 20 |
| Press. (kPa) | 4918 | 5303 |
| Catalyst feed (kg/h) | 2.1 | 1.3 |
| H2 (g/h) | 0.7 | 0.6 |
| **Loop (R-1)** | | |
| Temp. (° C.) | 75 | 70 |
| Press. (kPa) | 4868 | 5210 |
| Feed H2/C3 ratio (mol/kmol) | 0.1 | 0.1 |
| Feed C2/C3 ratio (mol/kmol) | 0.0 | 1.3 |
| Feed C4/C3 ratio (mol/kmol) | 28.4 | — |
| Feed C6/C3 ratio (mol/kmol) | — | 3.4 |
| Polymer Split (wt.-%) | 45 | 60 |
| $MFR_2$ (g/10 min) | 2.0 | 2.5 |
| Total C4 (wt.-%) | 5.0 | — |
| Total C6 (wt.-%) | — | 1.5 |
| **GPR (R-2)** | | |
| Temp. (° C.) | 80 | 80 |
| Press. (kPa) | 2499 | 2520 |
| Total C4 feed (kg/h), R-1 + R-2 | 6 | — |
| Total C4 feed (kg/h), only R-2 | 1 | — |
| Total C6 feed (kg/h) | — | 0.9 |
| H2/C3 ratio (mol/kmol) | 1.0 | 1.1 |
| C4/C3 ratio (mol/kmol) | 26 | — |
| C6/C3 ratio (mol/kmol) | — | 6.5 |
| Polymer residence time (h) | 2.8 | 3.1 |
| Polymer Split (wt.-%) | 55 | 40 |
| Total C4 (wt.-%) | 4.4 | — |
| Total C6 (wt.-%) | — | 3.2 |

TABLE 1-continued

| Preparation of the polypropylene composition (C) | | |
|---|---|---|
| | CP1 | CP2 |
| Copolymer | | |
| XCS (%) | 0.5 | 0.7 |
| $MFR_2$ (g/10 min) | 1.0 | 1.20 |
| Tm (° C.) | 143 | 138 |
| Tcr (° C.) | 110 | 108 |

TABLE 2

| Compounding recipes of the comparative and inventive examples | | | | | | |
|---|---|---|---|---|---|---|
| | CE1 | CE2 | IE1 | IE2 | IE3 | IE4 |
| HECO | 99.25 | 67 | 87 | 67 | 67 | 62 |
| CP1 | | | 10 | 30 | | |
| CP2 | | | | | 30 | 25 |
| CP3 | | 30 | | | | |
| Talc | | | | | | 10 |
| Irganox B 215 | 0.15 | 0.15 | 0.15 | 0.15 | 0.15 | 0.15 |
| CaSt | 0.15 | 0.15 | 0.15 | 0.15 | 0.15 | 0.15 |
| Carbon Black | 1.5 | 1.5 | 1.5 | 1.5 | 1.5 | 1.5 |
| PP1 | 1.2 | 1.2 | 1.2 | 1.2 | 1.2 | 1.2 |

HECO is the commercial heterophasic propylene copolymer EG066A1 of Borealis AG, Austria, having an MFR (230° C./2.16 kg) of 22 g/10 min, an XCS content of 29 wt.-% and a total ethylene content 13.5 wt.-%. The XCS fraction of said HECO has an intrinsic visciosity of 3.1 dl/g and an ethylene content of 40 wt.-%.

CP3 is the commercial C3/C2 copolymer RA130E of Borealis AG, Austria, having a melt flow rate of 0.5 g/10 min, a xylene soluble content of 7.0 wt.-% and an ethylene content of 4.0 wt.-%.

Talc is Steamic T1CA having a median particle size d50 of 1.8 μm and a top-cut particle size d95 of 6.2 μm, commercially available from Imerys, France.

Irganox B215 is a synergistic blend of the stabilizers Irgafos 168 and Irganox 1010, and is commercially available from BASF SE.

CaSt is calcium stearate, CAS-No 1592-23-0, commercially available from Faci

Carbon Black is the commercial carbon black masterbatch "Plasblak PP6331" of Cabot Corporation, Germany PP1 is HC001A-B1, a polypropylene homopolymer used as a masterbatch carrier polymer produced by Borealis AG, Austria, having an MFR of about 2 g/10 min and a Tm of 160° C.

TABLE 3

| Properties of the comparative and inventive examples | | | | | | | |
|---|---|---|---|---|---|---|---|
| | | CE1 | CE2 | IE1 | IE2 | IE3 | IE4 |
| $MFR_2$ | g/10 min | 20 | 3 | 12 | 6 | 5 | 6 |
| Energy to max (23° C.) | J | 38 | 27 | 20 | 20 | 22 | 8 |
| Puncture energy (23° C.) | J | 60 | 30 | 37 | 39 | 40 | 23 |
| Energy to max (−30° C.) | J | 33 | | 33 | 35 | 33 | |
| Puncture energy (−30° C.) | J | 55 | | 39 | 40 | 38 | |
| Charpy NIS (23° C.) | $kJ/m^2$ | 15 | 13 | 35 | 35 | 39 | 29 |
| Tensile Modulus | MPa | 1081 | 1102 | 1108 | 1094 | 1224 | 1856 |
| Elong. At Break | % | 27 | 42 | 40 | 456 | 371 | 62 |
| Flexural Modulus | MPa | 1000 | 1037 | 1037 | 1054 | 1050 | 1839 |
| Shrinkage in flow 60 × 60 × 2 mm | % | 1.54 | 1.61 | 1.49 | 1.47 | 1.52 | 1.23 |
| Shrinkage cross flow 60 × 60 × 2 mm | % | 1.59 | 1.62 | 1.6 | 1.64 | 1.66 | 1.29 |
| Tm1 | ° C. | | 163 | 164 | 161 | 162 | 163 |
| Tm2 | ° C. | | 157 | 157 | 155 | 155 | 156 |
| Tm3 | ° C. | | 120 | 119 | 119 | 119 | 119 |
| Tc1 | ° C. | | 126 | 127 | 126 | 126 | 127 |
| Tc2 | ° C. | | 102 | 102 | 103 | 103 | 102 |

Injection-moulding of the presented compositions was performed on an Engel E380 machine. Firstly non-foamed injection moulded plaques with dimensions of 400×200×2 mm were prepared using conventional injection-moulding technology as described in the literature [D. Rosato, D. Rodato, M. Rosato, Injection moulding handbook, 3rd Edition, Volume 1, ISBN 978-1-4613-7077-2, 2000]. In a second step foaming injection-moulding was performed using the chemical blowing agent masterbatch POLYTHLENE EE25C manufactured by EIWA CHEMICAL IND. CO., LTD. The materials were foamed using core back technology from 2 mm starting thickness to 3 mm end thickness. Foamed injection-moulded plates with dimensions of 400×200×3 mm were produced. Specimen for further characterization were prepared from the non-foamed and foamed plaques. The results are presented in Table 4.

TABLE 4

Properties of foamed and unfoamed plaques of the invention

| | | CE1 | CE2 | IE1 | IE2 | IE3 |
|---|---|---|---|---|---|---|
| Non-foamed plaques, 2 mm thick | | | | | | |
| Flexural Modulus | MPa | 1126 | 1256 | 1179 | 1194 | 1341 |
| Energy to max, 0.01 m/s, not clamped | J | 10 | | 15 | 13 | 15 |
| Puncture Energy, 0.01 m/s, not clamped | J | 17 | | 25 | 30 | 31 |
| Foamed plaques 3 mm thick | | | | | | |
| Flexural Modulus | MPa | 743 | 853 | 771 | 820 | 884 |
| Energy to max, 0.01 m/s, not clamped | J | 6 | | 10 | 16 | 14 |
| Puncture Energy, 0.01 m/s, not clamped | J | 7 | | 10 | 19 | 19 |

As can be gathered from Table 3, for the inventive examples, in which a propylene-hexene (C3C6) or a propylene-butylene (C3C6) random copolymer is used as a modifier, the Charpy NIS and the elongation at break are markedly improved, whilst the stiffness (i.e. tensile modulus and flexural modulus) are at least maintained and in some cases are even improved with respect to the values obtained for the HECO without a modifier (CE1), resulting in a much improved balance of mechanical properties. When a propylene-ethylene (C3C2) random copolymer having a similar molecular weight is employed as modifier, this effect is not observed, as can be seen from the Charpy NIS values fof CE2.

The invention claimed is:

1. A polypropylene composition (C) comprising:

i) from 55.0 to 67.0 wt. %, based on the total weight of the polypropylene composition, of a heterophasic propylene copolymer (HECO) having a melt flow rate $MFR_2$ measured according to ISO 1133 at 230° C. and 2.16 kg in the range from 10.0 to 40.0 g/10 min, and a xylene cold soluble fraction (XCS) determined at 23° C. according to ISO 16152 in the range from 25.0 to 40.0 wt. %, ii) from 25.0 to 45.0 wt. %, based on the total weight of the polypropylene composition, of a copolymer (CP) of propylene and at least one comonomer selected from the group of $C_4$-$C_{10}$ alpha-olefins that has been synthesized in the presence of a single-site catalyst and has a melt flow rate $MFR_2$ measured according to ISO 1133 at 230° C. and 2.16 kg in the range from 0.2 to 7.0 g/10 min, wherein the polypropylene composition (C) has a melt flow rate $MFR_2$ measured according to ISO 1133 at 230° C. and 2.16 kg of from 1.0 to 30.0 g/10 min, and wherein the polypropylene composition (C) has a Charpy Notched Impact Strength NIS measured according to ISO 179-1eA at 23° C. of greater than or equal to 16.0 $KJ/m^2$.

2. The polypropylene composition (C) according to claim 1, wherein the polypropylene composition comprises:

from 0 to 15 wt. %, based on the total weight of the polypropylene composition, of a mineral filler (F).

3. The polypropylene composition (C) according to claim 1, wherein the copolymer (CP) has a comonomer content of from 0.1 to 5.0 mol. %.

4. The polypropylene composition (C) according to claim 1, wherein the copolymer (CP) has a xylene cold soluble fraction (XCS) determined at 23° C. according to ISO 16152 in the range from 0.1 to 7.5 wt. %.

5. The polypropylene composition (C) according to claim 1, wherein the copolymer (CP) has a melting temperature ($T_m$) measured by differential scanning calorimetry (DSC) in the range from 120 to 155° C.

6. The polypropylene composition (C) according to claim 1 wherein the copolymer (CP) is a copolymer of propylene and 1-butene, or a copolymer of propylene and 1-hexene.

7. The polypropylene composition (C) according to claim 1, wherein the heterophasic propylene copolymer (HECO) has:

i) a content of ethylene as determined from 13C-NMR spectroscopy in the range of 5.0 to 20.0 wt. %, and/or ii) an intrinsic viscosity (iV) of the xylene cold soluble fraction measured according to DIN ISO 1628/1, October 1999 (in Decalin at 135° C.) in the range from 2.0 to 4.0 dl/g, and/or iii) a Charpy Notched Impact Strength NIS measured according to ISO 179-1 eA at 23° C. in the range of 10.0 to 30.0 $KJ/m^2$, and/or iv) a flexural modulus measured according to ISO 178 in the range of 800 to 1500 MPa.

8. The polypropylene composition (C) according to claim 2, wherein the mineral filler (F) is selected from the group of mica, wollastonite, kaolinite, smectite, montmorillonite, talc and mixtures thereof.

9. The polypropylene composition (C) according to claim 1, wherein the polypropylene composition (C) has:

i) a tensile modulus measured according to ISO 527-1, -2 in the range of 900 to 2500 MPa, and/or ii) a flexural modulus measured according to ISO 178 in the range of 850 to 2500 MPa, and/or iii) a melting temperature ($T_m$) measured by differential scanning calorimetry (DSC) in the range from 155 to 172° C., and/or iv) a crystallization temperature ($T_c$) measured by differential scanning calorimetry (DSC) in the range from 116 to 136° C., and/or v) a puncture energy measured according to ISO 6603-2 at 23° C. in the range from 10.0 to 50.0 J, and/or vi) a puncture energy measured according to ISO 6603-2 at -30° C. in the range from 25.0 to 60.0 J, and/or vii) an elongation at break measured according to ISO 527 in the range from 30 to 750%, and/or viii) a shrinkage in flow measured according to EN DIN ISO 294-4 of less than 2.0%, and/or ix) a shrinkage cross flow measured according to EN DIN ISO 294-4 of less than 2.2%.

10. An injection-molded article comprising the polypropylene composition (C) according to claim 1.

11. The injection-molded article according to claim 10, wherein the article has:

i) a flexural modulus measured according to ISO 178 in the range of 1000 to 1500 MPa, and/or ii) an energy to max Force measured according to ISO 6603-2 at 23° C. greater than or equal to 10.0 J, and/or iii) a puncture energy measured according to ISO 6603-2 at 23° C. greater than or equal to 17.0 J.

12. A foamed article comprising the polypropylene composition according to claim 1.

13. The foamed article according to claim 12, wherein the article has:

i) a flexural modulus measured according to ISO 178 in the range of 600 to 1200 MPa, and/or ii) an energy to max Force measured according to ISO 6603-2 at 23° C. greater than or equal to 6.0 J, and/or iii) a puncture energy measured according to ISO 6603-2 at 23° C. greater than or equal to 7.0 J.

14. The foamed article according to claim 12, wherein the flexural modulus measured according to ISO 178 is in the range of 200 to 650 MPa lower than the flexural modulus of an unfoamed injection-molded article measured according to ISO 178.

* * * * *